US011489895B1

(12) United States Patent
Fardig et al.

(10) Patent No.: US 11,489,895 B1
(45) Date of Patent: Nov. 1, 2022

(54) MUTE CONTROL DEACTIVATION IN ONLINE CONFERENCE

(71) Applicant: Lenovo (Singapore) Pte. Ltd., Singapore (SG)

(72) Inventors: Matthew Fardig, Boonville, IN (US); Tobias Christensen, San Francisco, CA (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/344,167

(22) Filed: Jun. 10, 2021

(51) Int. Cl.
*H04L 65/403* (2022.01)
*G10L 15/22* (2006.01)

(52) U.S. Cl.
CPC ............ *H04L 65/403* (2013.01); *G10L 15/22* (2013.01)

(58) Field of Classification Search
CPC .............................. H04L 65/403; G10L 15/22
USPC ........................................................ 709/204
See application file for complete search history.

(56) References Cited

U.S. PATENT DOCUMENTS

| 8,392,503 | B2* | 3/2013 | Kuhlke | H04L 12/1822 709/204 |
|---|---|---|---|---|
| 2016/0261648 | A1* | 9/2016 | Ruetschi | H04L 65/403 |
| 2019/0052471 | A1* | 2/2019 | Panattoni | G06F 3/0484 |
| 2021/0014074 | A1* | 1/2021 | Dhawan | H04L 65/403 |
| 2021/0399911 | A1* | 12/2021 | Jorasch | H04L 65/403 |

\* cited by examiner

*Primary Examiner* — Wing F Chan
*Assistant Examiner* — Leon Y Tseng
(74) *Attorney, Agent, or Firm* — Ference & Associates LLC

(57) ABSTRACT

One embodiment provides a method, including: receiving, at an information handling device, context data associated with one or more participants engaged in an online conference, wherein each of the one or more participants is initially muted; identifying, using a processor, an instance in the online conference where participation is invited from a subset of the one or more participants; determining, based on the context data, the subset of the one or more participants; and deactivating, based on the determining, a mute control for the subset of the one or more participants. Other aspects are described and claimed.

20 Claims, 3 Drawing Sheets

MUTE CONTROL DEACTIVATION IN ONLINE CONFERENCE

BACKGROUND

Individuals frequently utilize information handling devices ("devices"), for example laptop and/or personal computers, tablet devices, hybrid devices, smart phones, and the like, to participate in online conferences. More particularly, an individual may utilize their device to connect to an online remote meeting space (e.g., via a meeting application, etc.). In this online space, an individual may interact and communicate with other meeting participants (e.g., via audible input, text input, a combination thereof, etc.), some or all of which may be located in a different geographic location.

BRIEF SUMMARY

In summary, one aspect provides a method, including: receiving, at an information handling device, context data associated with one or more participants engaged in an online conference, wherein each of the one or more participants is initially muted; identifying, using a processor, an instance in the online conference where participation is invited from a subset of the one or more participants; determining, based on the context data, the subset of the one or more participants; and deactivating, based on the determining, a mute control for the subset of the one or more participants.

Another aspect provides an information handling device, including: a processor; a memory device that stores instructions executable by the processor to: receive context data associated with one or more participants engaged in an online conference, wherein each of the one or more participants is initially muted; identify an instance in the online conference where participation is invited from a subset of the one or more participants; determine, based on the context data, the subset of the one or more participants; and deactivate, based on the determining, a mute control for the subset of the one or more participants.

A further aspect provides a product, including: a storage device that stores code, the code being executable by a processor and comprising: code that receives context data associated with one or more participants engaged in an online conference, wherein each of the one or more participants is initially muted; code that identifies an instance in the online conference where participation is invited from a subset of the one or more participants; code that determines, based on the context data, the subset of the one or more participants; and code that deactivates, based on the determining, a mute control for the subset of the one or more participants.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
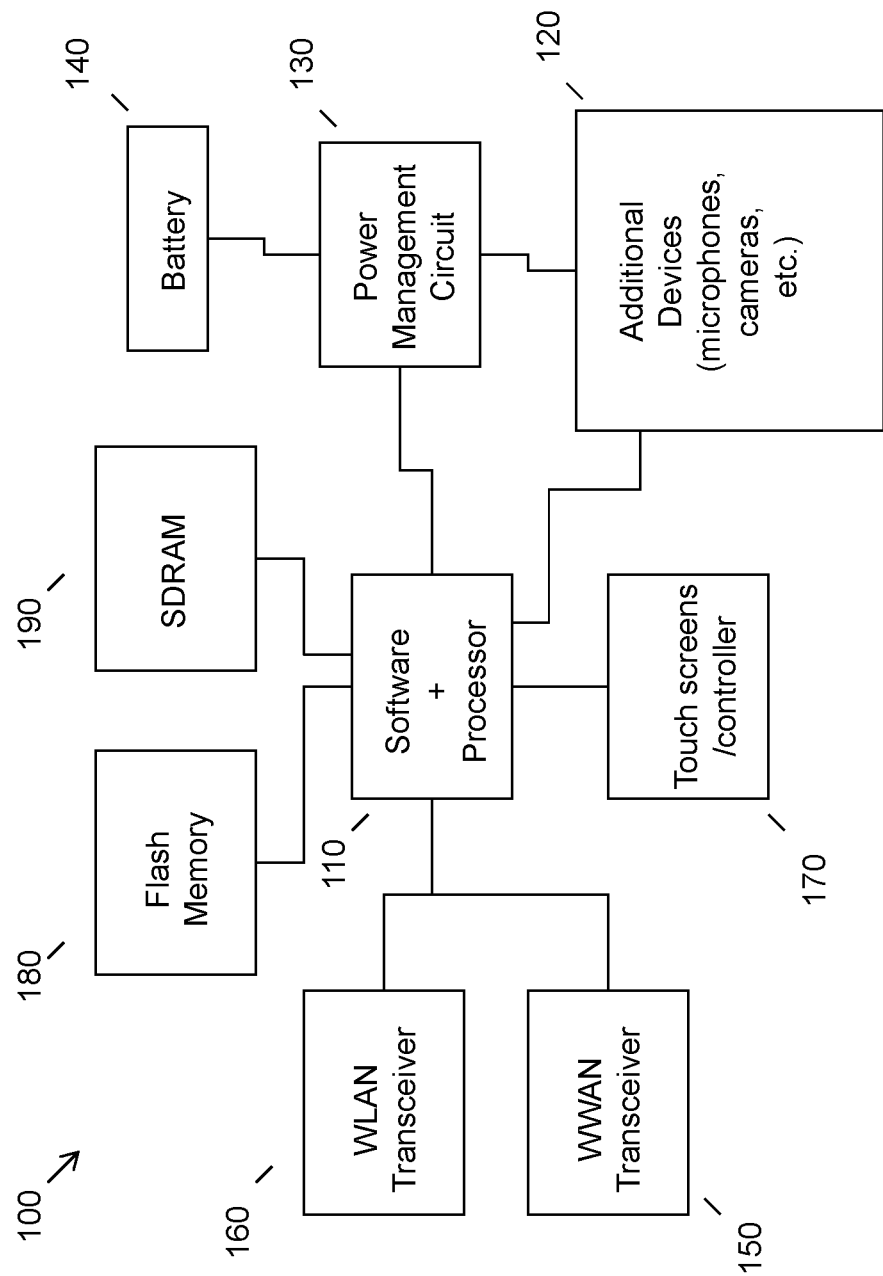
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Various tools exist today that enable an online conference administrator to maintain order among conference participants and to ensure that the conference runs smoothly. In particular, an administrator may utilize a mute control to prevent some or all of the participants from providing input at various points during the conference. The mute control is often utilized in both small and large conference settings and: ensures that presenters are not interrupted, prevents various types of background noise from entering the general conference space, reduces overheard/cost of conference by allowing only necessary attendees to be included in the audio mix, and allows an administrator to control which attendee(s) are allowed to talk and when.

Although generally effective, conventional mute control systems present certain issues. For example, if the conference is being administered by a sole presenter then that presenter must frequently take their attention away from the conference in order to toggle these settings for desired attendees. Such a requirement may be tedious to the presenter and may degrade the quality of their presentation and/or the conference. As another example, a dedicated mute control administrator may be present to control these settings. Although the presence of such an individual may enable the conference presenter to fully focus on their presentation, such a service requires additional money and drives up the cost of the online conference. In yet another example, if the online conference is very large it is often difficult to manage due to the sheer number of participants present, even with a dedicated individual managing the mute controls.

Accordingly, an embodiment provides a method for dynamically managing the mute controls in an online conference. In an embodiment, context data associated with one or more initially muted participants engaged in an online conference may be received by a system. This context data may include one or more of: participant identity data, participant location data, participant physical characteristic data, participant attention level data, participant behavior data, and participant conferencing capability data. An embodiment may then identify an instance in the online conference where participation is invited from one of more of the participants. For example, a presenter may ask a certain group or a certain amount of participants to respond to a question, a system may identify that certain participants are responsible for speaking during a particular portion of the presentation, etc. An embodiment may then determine the identities of the subset of participants that may speak at the identified point and may thereafter dynamically deactivate, without receiving manual user input, a mute control for those individuals to enable them to provide input to the online conference. Such a method may therefore improve online conference management.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
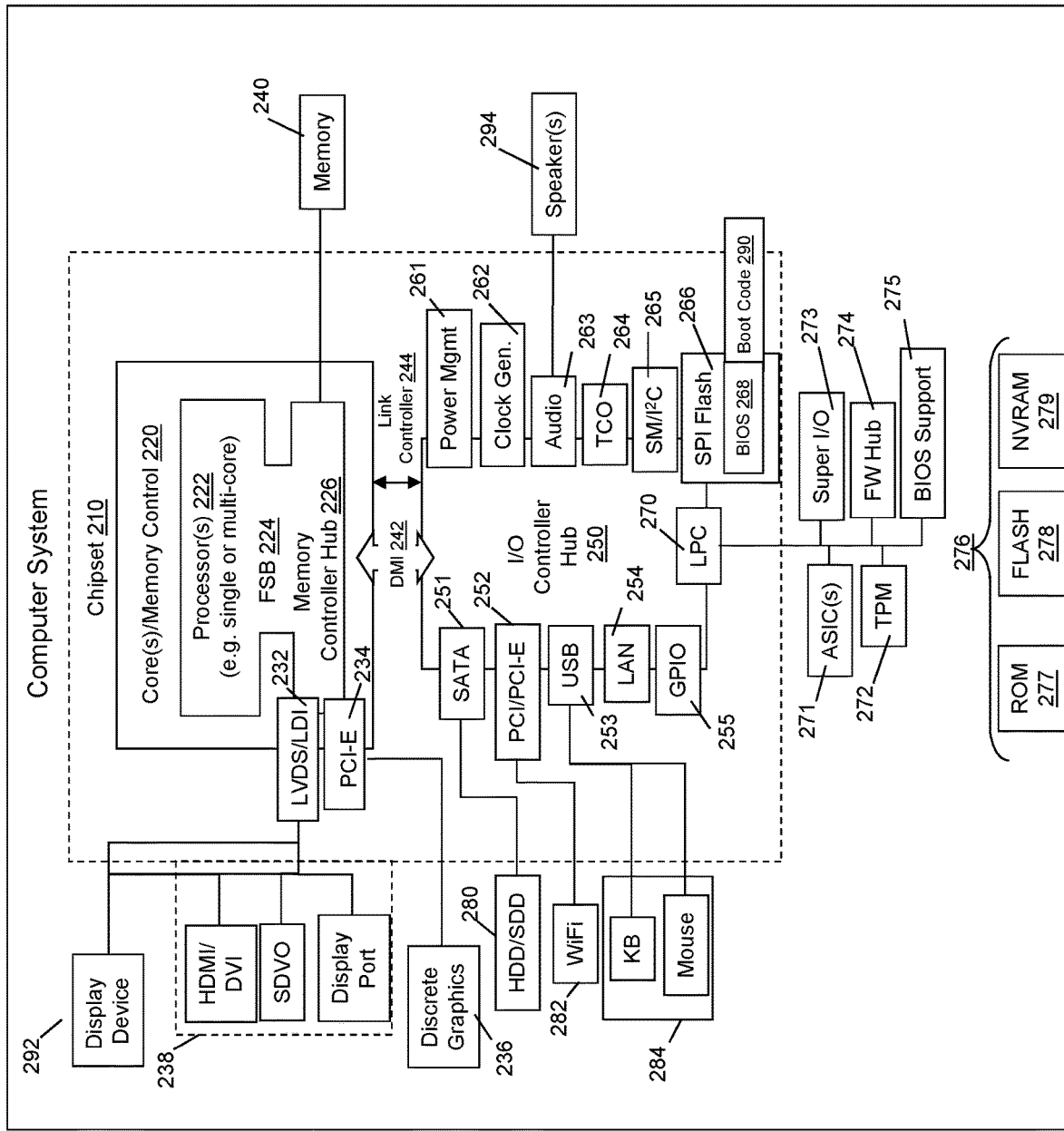
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in devices capable of connecting to an online conference. For example, the circuitry outlined in FIG. 1 may be implemented in a smart phone or tablet embodiment, whereas the circuitry outlined in FIG. 2 may be implemented in a laptop.

Figure 3:
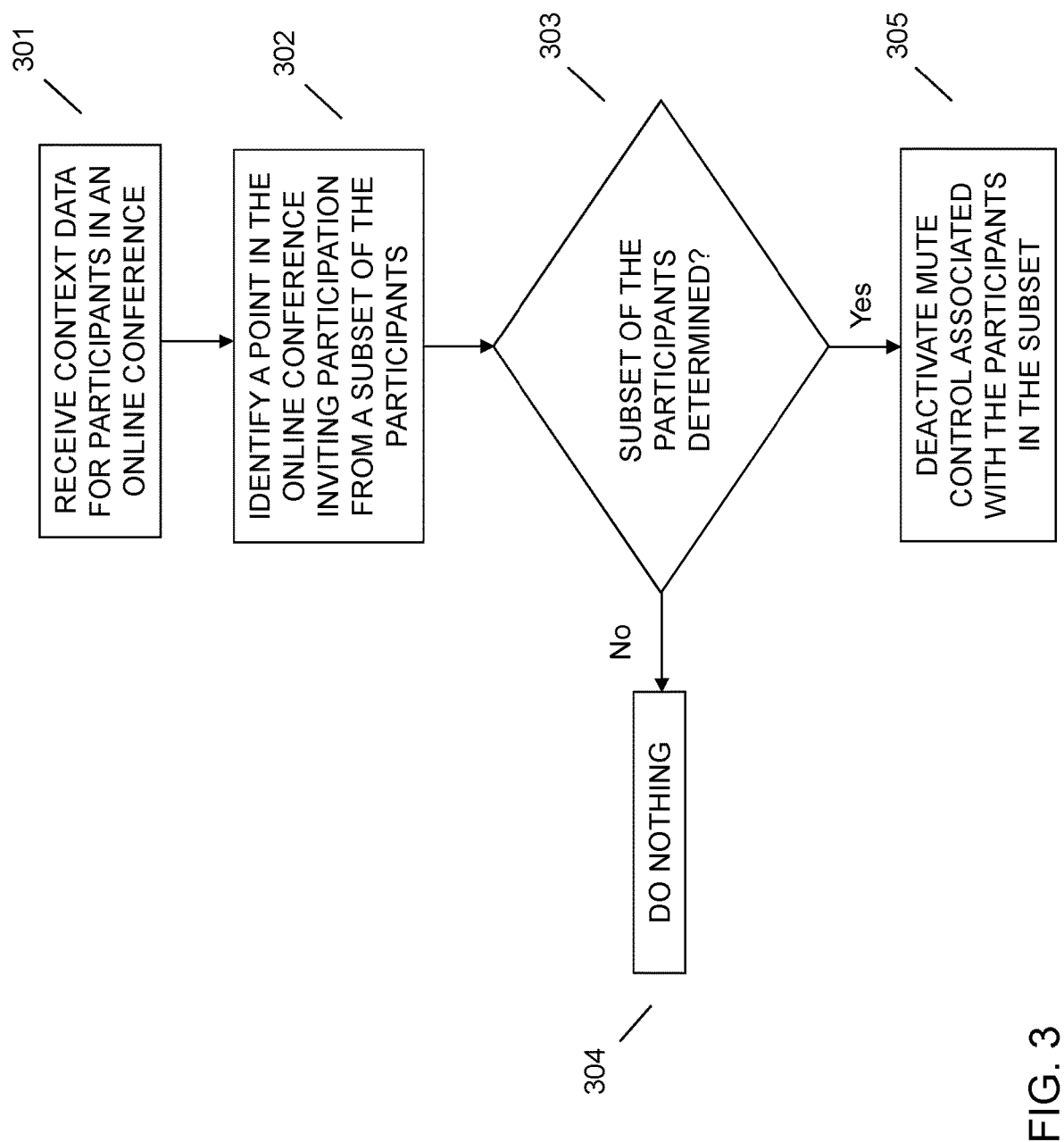
FIG. 3 illustrates an example method of dynamically deactivating a mute control for target participants in an online conference.

Referring now to FIG. 3, an embodiment provides a method of dynamically cycling administrator mute for participants in an online conference. At 301, an embodiment may receive context data associated with one or more participants engaged in an online conference. In an embodiment, the online conference may be facilitated over a conventional conferencing application that participants may connect to. In an embodiment, context data associated with the participants may be utilized to effectively perform one or more downstream processes. In an embodiment, the context data may be received by the conferencing application or by a device hosting the online conference and may be a combination of data that may be generally known by a system as well as data that is obtained by sensors (e.g., cameras, microphones, etc.) associated with a local device of a participant, as further described below.

In an embodiment, the context data may include one or more of: participant identity data (e.g., name of the participant, organization the participant works for or is associated with, what the participant's role is in that organization, etc.), participant location data (e.g., the location the participant is situated in, etc.), participant physical characteristic data (e.g., data obtained from local sensors associated with a participant's device such as the color and/or type of clothes they are wearing, hair length, gender, etc.), participant attention level data (e.g., analysis of captured video of a participant may be analyzed to determine attention level, analysis of a participant's behavior within an application, etc.), participant behavior data (e.g., whether the participant has raised their hand, whether the participant has asked a question, etc.), and participant conferencing capability data (e.g., determination of the type of input devices available to an individual, determination of the type of connecting device utilized by participant, etc.).

At 302, an embodiment may identify an instance in the online conference where participation is invited from one or more of the participants. The identification of this instance may be facilitated in one or more different ways. For example, an embodiment may continuously monitor and analyze (e.g., via one or more voice analysis techniques, etc.) the inputs (e.g., speech input, typing input, etc.) of a current presenter in the online conference and may conclude that the presenter desires participant input responsive to detecting a predetermined trigger word or phrase in the speech input. Identification of the predetermined trigger word or phrase may be made by reference to an accessible local or remote database that contains a listing of the actionable trigger words or phrase. As a non-limiting example of the foregoing, a presenter may ask a question to a particular participant, e.g., "What do you think about that, Matt?" or may ask for feedback from a group of participants, e.g., "Can everyone on the west coast please provide their thoughts on this?" Responsive to identifying that a presenter is directing a question to one of more participants, an embodiment may conclude that this is a point in the conference at which the presenter is inviting input.

In another embodiment, the progress of a presentation occurring during the online conference may be dynamically monitored and analyzed. An embodiment may also access presentation agenda data to identify the presentation responsibilities associated with each portion. Stated differently, an embodiment may identify which individuals are scheduled to speak during each portion of the presentation. Responsive to identifying that the presentation has arrived at a particular portion, an embodiment may conclude that certain individuals are invited to provide input. As an example of the foregoing, an online conference may include a slideshow presentation. An embodiment may identify that Participant A is responsible for covering the content in Slide X. Accordingly, when the presentation arrives at Slide X an embodiment may receive an indication that this is a point in the presentation that input is invited from Participant A.

In another embodiment, a video feed associated with each of the participants may be received and analyzed. An embodiment may conclude that participant input is invited responsive to detecting, in the video feed, a predetermined action from one or more of the participants that indicates their desire to provide input. The identification of the predetermined action may be facilitated by reference to an accessible local or remote database that contains a list of the actionable participant actions. As an example of the foregoing, a participant in an online conference may raise their hand to ask a question. A system of the embodiments may identify, from the video feed, that the participant raised their hand and may subsequently associate that participant action as a point in the conference at which input is desired to be provided.

Responsive to identifying the instance in the conference at which point input is invited, an embodiment may determine, at 303, the identities of the subset of participants that may provide input to the conference by referencing the context data received at Step 301. Responsive to not being able to determine, at 303, the identities of the subset, an embodiment may, at 304, take no additional action. Additionally or alternatively, an embodiment may provide a notification (e.g., to an administrator of the conference, etc.) that a point inviting input has been identified but that the participants input is intended to be provided from could not be determined. Conversely, responsive to determining, at 303, the identities of the subset, an embodiment may deactivate, at 305, a mute control for those identified participants.

In an embodiment, deactivation of the mute control enables the relevant participants to provide input to the conference. In an embodiment, the deactivation of the mute control may occur automatically (i.e., without any type of manual user input). In an embodiment, the mute control may remain deactivated until a predetermined event has occurred. For example, the mute control may remain deactivated for a predetermined period of time (e.g., 30 seconds, 1 minute, 10 minutes, etc.). As the predetermined time period nears expiration, an embodiment may dynamically provide the participant with a notification informing them of this fact. This predetermined time period may be explicitly set by an administrator or may be dynamically determined by a system. As an example of the latter, an embodiment may first identify context surrounding a question asked by a conference administrator (e.g., complexity of the question, open-endedness of question, number of reasonable responses to the question, etc.). Based on this context, an embodiment may then predict an average response time for the question (e.g., by referencing crowdsourced data of response times to similar questions, etc.) and may keep that mute control deactivated for that average response time. In another embodiment, the mute control may remain deactivated until input has been detected from a designated participant.

The subsequent paragraphs illustrate example implementations of aspects of the inventive concept. These examples are not intended to be limiting and the inventive concept may be applied to other scenarios not explicitly disclosed here.

An instructor in an online classroom may initially mute the entire class to ensure the classroom is quiet while they are teaching. During the lesson, the teacher may ask a question and request an answer from "any student in Group B". Based on an identification of a trigger phrase (i.e., a question directed to the class), an embodiment may identify that the teacher has invited input from the classroom. Additionally, based upon knowledge of the students present in each designated group, an embodiment may identify which students are in Group B. An embodiment may then automatically deactivate the mute control for each student identified as being in Group B so that they could provide an answer to the question.

A virtual Town Hall meeting may contain many attendees. An embodiment may have access to a predefined agenda that identifies the planned sections of the meeting, which individuals are planning to speak in each section, and for how long each section may last. With this information, an embodiment may monitor the progress of the meeting and may dynamically deactivate a mute control for individuals when their designated section occurs. As the allotted speaking time for each individual nears expiration, an embodiment may provide them a notification (e.g., an audible notification, a visual notification, a combination thereof, etc.) that informs them of this fact. Once their session has completely expired, an embodiment may dynamically reactivate the mute control for the relevant individuals.

A webinar may contain sections designated as "lecture only" (i.e., where participants should just listen) and other sections designated for discussion (i.e., where participants may talk). In the webinar, a slideshow may be used to guide the main topics. Based on the slide that is currently displayed, the conferencing application can make intelligent decisions about when to deactivate the mute controls for the attendees. For example, the first three slides may be designated as lecture only slides, so only the presenter may be able to provide input to the conference. When a "Q&A" slide appears, the mute controls for all attendees may automatically be deactivated should they wish to participate in the discussion. Likewise, during one of the first three slides if an attendee attempts to unmute then the software may notify them in some way that they will have a chance to provide input once slide four appears. An embodiment may also provide the attendee with context clues about when the "Q&A" slide is coming, e.g., "on the next slide, you will have a chance to ask questions", etc.

The various embodiments described herein thus represent a technical improvement to conventional methods of cycling mute controls for an online conference. Using the teachings described herein, an embodiment may receive context data associated with one or more participants engaged in an online conference. An embodiment may then identify a point in the online conference that invites participation from a subset of the participants. Thereafter, an embodiment may determine identities of participants associated with the subset and may dynamically deactivate a mute control for those identified participants. Such a method may ease the burden on conference administrators and may promote a smoother flow of online conferences.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an information handling device, context data associated with one or more participants engaged in an online conference, wherein each of the one or more participants is initially muted;
identifying, using a processor, an instance in the online conference where participation is invited from a subset of the one or more participants;
determining, based on the context data, the subset of the one or more participants; and
deactivating, based on the determining, a mute control for the subset of the one or more participants.

2. The method of claim 1, wherein the context data is selected from the group consisting of: participant identity data, location data, physical characteristic data, attention level data, participant behavior data, and conferencing capability data.

3. The method of claim 1, wherein the identifying the instance comprises:
monitoring speech input of a moderator of the online conference; and
detecting, within the speech input, a trigger phrase indicating a desire by the moderator to receive voice input from the subset.

4. The method of claim 1, wherein the identifying the instance comprises:
monitoring progress of a presentation occurring during the online conference; and
detecting a portion of the presentation that corresponds to an audio input responsibility of at least one of the subset.

5. The method of claim 1, wherein the identifying the instance comprises:
receiving a video feed of each of the one or more participants in the online conference; and
detecting, within the video feed, an action from at least one of the one or more participants indicating a desire to participate.

6. The method of claim 1, wherein the deactivating comprises dynamically deactivating without receiving manual user input.

7. The method of claim 1, further comprising reactivating the mute control responsive to identifying a predetermined event.

8. The method of claim 7, wherein the predetermined event is one of: an expiration of a predetermined time period and a detection of voice input from at least one of the subset.

9. The method of claim 8, further comprising providing, at a point near the end of the predetermined time period, an alert notification that the predetermined time period is expiring.

10. The method of claim 1, further comprising:
receiving, from a participant of the one or more participants, a request to provide input when the mute control is active; and
informing the participant of a designated portion of the online conference at which the mute control for the participant may be deactivated.

11. An information handling device, comprising:
a processor;
a memory device that stores instructions executable by the processor to:
receive context data associated with one or more participants engaged in an online conference, wherein each of the one or more participants is initially muted;
identify an instance in the online conference where participation is invited from a subset of the one or more participants;
determine, based on the context data, the subset of the one or more participants; and
deactivate, based on the determining, a mute control for the subset of the one or more participants.

12. The information handling device of claim 1, wherein the context data is selected from the group consisting of: participant identity data, location data, physical characteristic data, attention level data, participant behavior data, and conferencing capability data.

13. The information handling device of claim 1, wherein the instructions executable by the processor to identify the instance comprise instructions executable by the processor to:
monitor speech input of a moderator of the online conference; and
detect, within the speech input, a trigger phrase indicating a desire by the moderator to receive voice input from the subset.

14. The information handling device of claim 11, wherein the instructions executable by the processor to identify the instance comprise instructions executable by the processor to:
monitor progress of a presentation occurring during the online conference; and
detect a portion of the presentation that corresponds to an audio input responsibility of at least one of the subset.

15. The information handling device of claim 11, wherein the instructions executable by the processor to identify the instance comprise instructions executable by the processor to:
receive a video feed of each of the one or more participants in the online conference; and
detect, within the video feed, an action from at least one of the one or more participants indicating a desire to participate.

16. The information handling device of claim 11, wherein the instructions are further executable by the processor to reactivate the mute control responsive to identifying a predetermined event.

17. The information handling device of claim 16, wherein the predetermined event is one of: an expiration of a predetermined time period and a detection of voice input from at least one of the subset.

18. The information handling device of claim 17, wherein the instructions are further executable by the processor to provide, at a point near the end of the predetermined time period, an alert notification that the predetermined time period is expiring.

19. The information handling device of claim 11, wherein the instructions are further executable by the processor to:
receive, from a participant of the one or more participants, a request to provide input when the mute control is active; and
inform the participant of a designated portion of the online conference at which the mute control for the participant may be deactivated.

20. A product, comprising:
a storage device that stores code, the code being executable by a processor and comprising:
code that receives context data associated with one or more participants engaged in an online conference, wherein each of the one or more participants is initially muted;

code that identifies an instance in the online conference where participation is invited from a subset of the one or more participants;
code that determines, based on the context data, the subset of the one or more participants; and
code that deactivates, based on the determining, a mute control for the subset of the one or more participants.

\* \* \* \* \*